Patented Nov. 1, 1949

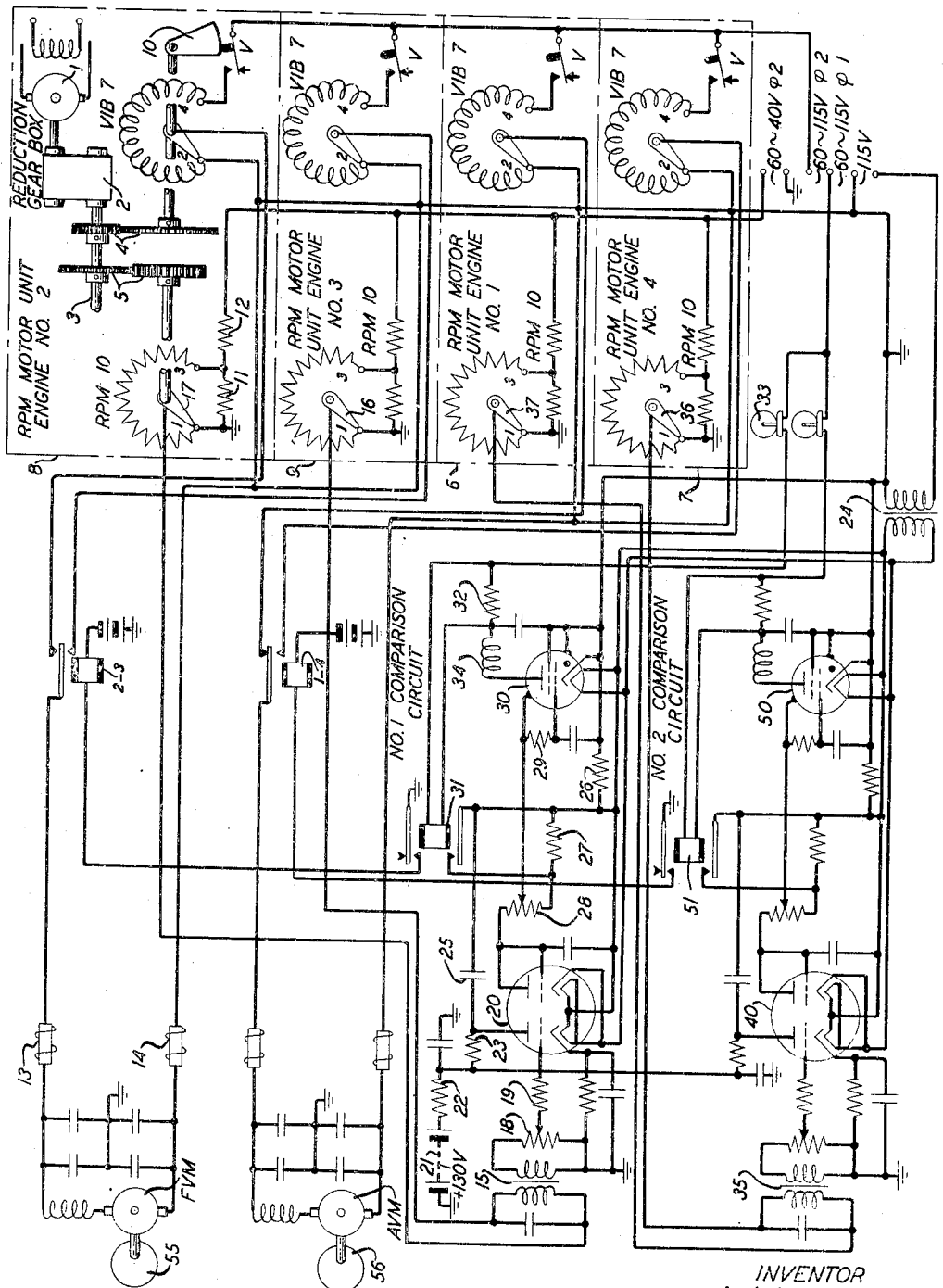

2,486,488

UNITED STATES PATENT OFFICE 2,486,488

GROUND TRAINER FOR SIMULATING THE ENGINES AND PROPELLER VIBRATIONS OF MULTIENGINED AIRPLANES

Joseph J. Lukacs, New Rochelle, N. Y., assignor to Bell Telephone Laboratories, Incorporated, New York, N. Y., a corporation of New York Application March 20, 1946, Serial No. 655,790

7 Claims. (Cl. 35—12)

This invention relates to a ground trainer for training aircraft crews and more particularly to circuits and apparatus for simulating the engine and propeller vibrations of a multiengined airplane.

Engine and propeller vibrations have heretofore been simulated in an aircraft trainer but such simulation has not been as realistic as desirable when applied to a trainer intended to simulate a multiengined airplane because no provision has been made for changing the intensity of the vibrations as a result of the engines running at different speeds.

It is the object of the present invention to more realistically simulate the vibrations produced in a multiengined airplane due to the operation of the engines at unequal speeds.

In accordance with the invention which has been disclosed as applicable to a trainer for simulating a four-engine airplane, two vibrators are provided, one mounted at the forward end of the flight deck and the other mounted at the aft end of the flight deck. Each vibrator comprises an eccentrically mounted weight rotatable by a motor.

The motor of the forward vibrator is controlled by either one of two "variacs" or variable transformers, one of which is a part of the R. P. M. motor unit which simulates one of the in-board engines of an airplane and the other of which is part of the R. P. M. motor unit which simulates the other of the in-board engines. A relay is provided for switching the vibrator motor to the control of either one of the variacs. Similarly the motor of the aft vibrator may be switched by a second relay to the control of either one of two other variacs associated respectively with the R. P. M. motor units which simulate the out-board engines of an airplane.

Control of the forward vibrator by the associated relay is taken over by the simulated in-board engine which has the greater simulated R. P. M. and control of the aft vibrator by the associated relay is also taken over by the out-board engine which has the greater R. P. M. To accomplish this two comparison circuits are provided, one of which continuously compares signal potentials derived by two potentiometers associated respectively with the R. P. M. motor units which simulate the in-board engines and the other of which continuously compares signal potentials derived by two potentiometers associated respectively with the R. P. M. motor units which simulate the out-board engines. The first of these comparison circuits controls the switching relay to control the switching of the forward vibrator motor to the variac of the R. P. M. motor unit of the in-board engine which has the larger simulated R. P. M. and the second of the comparison circuits controls the switching of the aft vibrator motor to the variac of the R. P. M. motor unit of the out-board engine which has the larger simulated R. P. M.

Each comparison circuit comprises an input transformer, a single stage of amplification, a bias rectifier, a thyratron tube and a relay. Potentials of the same phase are applied to the primary winding terminals of the transformer from potentiometers of two R. P. M. units which simulate the two engines whose speeds are to be compared. If the potential on the upper terminal is greater than the potential on the lower terminal, the difference of potential is impressed on the secondary winding of the input transformer, is amplified and then impressed on the control grid of the thyratron tube as a potential of the phase $\varphi 1$ causing that tube, which will have a potential of the same phase applied to its anode, to fire and operate the relay connected into its cathode-anode circuit. If, however, the potential on the lower terminal of the primary winding of the input transformer is greater than the potential on the upper terminal of the primary winding, the resultant amplified potential on the grid of the thryratron tube will be of phase $\varphi 2$ or opposite to the phase $\varphi 1$ potential applied to the anode of the thyratron tube and such tube will not fire to operate the associated relay. The relay, when operated, causes the operation of the associated switching relay.

While the invention has been disclosed as applied to a trainer which simulates an airplane having four engines, it is to be understood that it is equally applicable to trainers which simulate two engined airplanes in which case but one vibrator and one comparison circuit would be required. It will also be apparent that another type of vibrator might be controlled to simulate the engine and propeller vibrations.

The invention having been briefly described, reference may now be had to the following detailed description read in connection with the accompanying single sheet of drawings which discloses the forward and aft vibrators, the two comparison circuits and the schematic representation of such portions of the R. P. M. motor units which are operated to simulate the speeds of rotation of the four engines of an airplane.

Each of the motor units disclosed schematically in the dot-dash boxes in the right portion of the drawing, is of the general type disclosed in Patent No. 2,428,767, granted October 14, 1947, to W. H. T. Holden, R. H. Gumley, R. C. Davis and W. P. Albert and in the application of J. J. Lukacs and W. B. Strickler, Serial No. 542,846, filed June 30, 1944. Such a motor unit comprises a motor, such as motor 1, which through a reduction gear box 2 drives a shaft 3. The shaft 3 through pairs of gears, such as 4 and 5, drives a plurality of potentiometers, such as R. P. M. 10, and variacs, such as VIB 7, which enter into the control of various circuits of the trainer. The motor 1 may be driven in one or the other direction under the control of a motor control circuit whereby the shaft 3 and the sliders of the potentiometers and variacs driven therefrom are rotated into positions commensurate with the assumed R. P. M. of the engine which the motor unit simulates. The motor control circuit may be controlled in a manner similar to that described in the aforementioned application. As indicated by the labels applied to the several boxes, the motor unit disclosed in boxes 6 and 7 simulate respectively the Nos. 1 and 4 out-board engines and the motor units disclosed in boxes 8 and 9 simulate respectively the Nos. 2 and 3 in-board engines. To simplify the drawing, the motor, reduction gear box, driving shaft and gearing have been omitted from boxes 6, 7 and 9.

Each motor unit is also provided with a cam operated switch V which is held in its open position by a cam 10 secured to the driving shaft of the variac VIB 7 until the slider of the variac has been moved to a position representative of an engine speed greater than approximately 350 R. P. M.

The potentiometer R. P. M. 10 of each motor unit has its winding shunted by a resistor 11 and is energized by potential applied across its terminals through a resistor 12 from a source of alternating current which may, for example be of 60 cycles at 40 volts and of phase φ2. As soon as a simulated engine speed in excess of 350 R. P. M. has been attained by a simulated engine and the switch V of the motor unit which simulates such engine becomes closed, alternating current is applied from a power source across the terminals of the variac VIB 7 whereupon a potential is derived from the slider of such variac, functioning as an auto transformer, for application to one of the vibrator motors. For example, if the switching relay 2—3 is unoperated, power is applied from the slider of the variac VIB 7 of the motor unit 8 for simulating the No. 2 engine, over the back contact of relay 2—3, through the choke coil 13 through the field winding and armature circuit of the forward vibrator motor FVM and thence through choke coil 14 to the ground terminal of the source of power. If, however, relay 2—3 is operated, indicative of the fact that the simulated speed of the No. 3 engine is greater than the simulated speed of the No. 2 engine, power is applied from the slider of the variac VIB 7 of the motor unit 9 for simulating the No. 3 engine, over the front contact of relay 2—3, thence as traced through the motor FVM to the ground terminal of the source of power. Similar circuits through the motor AVM and over either the back or front contacts of relay 1—4 and to the sliders of the variacs associated with the motor units 6 and 7 may be traced.

The vibrator motor unit comprising the motor FVM and eccentrically mounted weight 55 driven thereby is mounted on a forward bulkhead of the trainer and the vibrator motor unit comprising the motor AVM and eccentrically mounted weight 56 driven thereby is mounted on an aft bulkhead of the trainer.

The two comparison circuits shown in the lower portion of the drawing are identical in structure. The No. 1 comparison circuit, for example, which compares the signal potentials derived at the sliders of the potentiometers R. P. M. 10 of the R. P. M. motor units 8 and 9, has an input transformer 15, the upper terminal of the primary winding of which is connected to the slider 16 of the R. P. M. 10 potentiometer of motor unit 9 and the lower terminal of the primary winding of which is connected to the slider 17 of the R. P. M. 10 potentiometer of motor unit 8. Since the potentials at the sliders 16 and 17 are measures of the simulated speeds of the Nos. 2 and 3 engines and are of the same phase φ2, the difference in potential between the terminals of the primary winding of transformer 15 is a measure of the difference between the simulated engine speeds.

This difference potential is impressed upon the secondary winding of the transformer 15 and across the rheostat 18 from the slider of which potential is impressed through resistor 19 upon the control grid of the left unit of the amplifier tube 20. The left unit of tube 20 is supplied with anode potential from the +130-volt direct current source 21 through resistors 22 and 23 to the anode of tube 20. The cathodes of the tube 20 are heated conductively from the tube filament which is energized from the secondary winding of the filament transformer 24, the primary winding of which is energized from a 115-volt source of alternating current.

The amplified output from the left unit of tube 20 is applied from the anode of such unit through the coupling condenser 25 and resistor 26 to ground and potential is applied from the junction point between condenser 25 and resistor 26 through resistor 27, the bias adjusting rheostat 28 and resistor 29 to the control grid of the thyratron tube 30. The right unit of tube 20 is utilized to rectify potential derived from the filament heating supply circuit for application as a negative biasing potential to the control grid of tube 30. For this purpose the grid and anode of such right unit are connected together and the rectifying path through the right unit of the tube extends from the lower terminal of the secondary winding of transformer 24, over the cathode-anode path through the tube, through the winding of rheostat 28 and re-resistance 27 to the upper terminal of the secondary winding of transformer 24. Potential derived at the slider of rheostat 28 is then applied through resistor 29 to the control grid of tube 30. The biasing circuit is arranged to shift the value of the biasing potential to prevent the possibility of causing tube 30 to intermittently fire and cause relay 31 to vibrate when the resultant difference potential applied from the amplifier tube 20 to the grid of tube 30 hovers about the threshhold value for just operating the relay 31. Since a slightly higher voltage is required to operate relay 31 than is required to hold it from releasing, the resistor 27 is included in the circuit through the rectifier unit of tube 20 when relay 31 is unoperated whereupon the bias potential applied to the grid of tube 30 is increased and tube 30 will fire only in response to a larger signal potential than when relay 31 is operated and resistor 27 is short-circuited. When relay 31 is operated and resistor 27 is short-circuited, the negative bias applied to the grid of tube 30 is decreased and a smaller signal potential is then required to maintain relay 31 operated.

Relay 31 is connected in a circuit extending from a 60-cycle 115-volt phase φ1 source of current through the lamp resistor 33, thence in parallel with resistor 32 and the winding of relay 31 through choke coil 34, over the anode-cathode path through tube 30 to the ground terminal of the source of current. The cathode of the tube is conductively heated from the filament which is heated by current applied thereto from the secondary winding of transformer 24. Relay 31 in addition to controlling the shunt of resistor 27 also controls the establishment of an obvious circuit for relay 2—3.

The No. 2 comparison circuit is identical to the No. 1 comparison circuit just described except that the upper and lower terminals of the primary winding of its input transformer 35 are connected respectively to the sliders 36 and 37 of the R. P. M. 10 potentiometers associated with the motor units 7 and 6 which simulate the Nos. 4 and 1 engines and that the relay 51 of such circuit controls the switching relay 1—4.

It will be assumed that the simulated engines are all running at the same speed and that as a consequence the phase φ2 potentials applied from the sliders 16 and 17 to the terminals of the primary winding of transformer 15 are equal and the phase φ2 potentials applied from the sliders 36 and 37 to the terminals of the primary winding of transformer 35 are also equal. No potentials will therefore be impressed from the secondary windings of transformers 15 and 35 upon the control grids of the amplifier tubes 20 and 40 and no amplified signal potential will be applied to the control grids of the thyratron tubes 30 and 50. Such latter tubes will not therefore fire and relays 31, 51, 2—3 and 1—4 will remain unoperated.

With relays 2—3 and 1—4 unoperated, the forward vibrator motor FVM is, as previously described, under the control of variac VIB 7 associated with the R. P. M. motor unit 8 and such motor therefore runs at a speed commensurate with the simulated speed of the No. 2 engine. Also the aft motor AVM is, as previously described, under the control of variac VIB 7 associated with the R. P. M. motor unit 9 and such motor therefore runs at a speed commensurate with the simulated speed of the No. 1 engine.

It will now be assumed that a reduction in the speed of the No. 2 engine is simulated either by a closing of the engine throttle or by an engine failure simulated under the control of the instructor. As a result, the slider 17 of potentiometer R. P. M. 10 of motor unit 8, through the operation of motor 1, is moved back toward the No. 1 terminal of its winding thereby reducing the phase φ2 potential applied to the lower terminal of the primary winding of input transformer 15. The phase φ2 potentials applied to the terminals of the primary winding of transformer 15 being now unequal, the difference potential impressed from the secondary winding of transformer 15 upon the grid of amplifier tube 20, amplified by such tube appears as a phase φ1 potential on the control grid of tube 30 and since as previously described, phase φ1 potential is applied to the anode of tube 30, tube 30 will fire each time the anode potential becomes positive and will cause relay 31 to operate. The provision of choke coil 34 in the anode circuit of tube 30 insures that relay 31 will remain continuously operated so long as the signal potential applied to the control grid of tube 30 remains sufficiently great to cause tube 30 to fire.

Relay 31 upon operating controls the normal negative bias of relay 30 as previously described and causes the operation of switching relay 2—3 to switch control of the forward vibrator motor FVM from the control of the R. P. M. motor unit 8 of the No. 2 engine to the R. P. M. motor unit 9 of the No. 3 engine which is now assumed to be operating at a higher simulated speed than the No. 2 engine.

It will now be assumed that the simulated speed of the No. 2 engine is raised until it is greater than the simulated speed of the No. 3 engine. As a consequence, the phase φ2 potential applied from the slider 17 is first raised through the movement of slider 17 towards the No. 3 terminal of the potentiometer winding until the potentials applied from the sliders 16 and 17 to the lower and upper terminals of the primary winding of transformer 15 again become equal and no amplified signal potential becomes applied to the control grid of tube 30. Hence with relay 31 at the time operated, the resistor 27 is shunted over the lower contacts of relay 31 and the normal negative bias applied to the grid of tube 30 is therefore increased. Tube 30 will cease firing as the value of the amplified signal is reduced toward a zero value and relay 31 will release in turn releasing relay 2—3. The control of the forward vibrator motor FVM is now returned to the control of the R. P. M. motor unit 8 which simulates the speed of the No. 2 engine.

As the simulated speed of the No. 2 engine becomes further increased so that it is greater than the simulated speed of the No. 3 engine, the phase φ2 potential applied from the slider 17 to the lower terminal of the primary winding of transformer 15 becomes greater than the phase φ2 potential applied from slider 16 to the upper terminal of the primary winding of transformer 15 and the difference potential which is applied from the secondary winding of transformer 15 to the grid of tube 20 and amplified by such tube becomes applied as an amplified potential of phase φ2 upon the control grid of tube 30. However, since at the same time potential of phase φ1 is applied to the anode of tube 30, such tube will not fire and relays 31 and 2—3 will remain unoperated whereby the motor FVM will remain under the control of the R. P. M. motor unit 8 which simulates the speed of the No. 2 engine.

In a similar manner the No. 2 comparison circuit compares the simulated engine speeds of the Nos. 1 and 4 engines and controls the operation of switching relay 1—4 to switch the aft vibrator motor AVM to the control of the R. P. M. motor units 6 or 7 dependent upon which motor unit has been adjusted to simulate the greater engine speed.

What is claimed is:

1. In a ground trainer for simulating a multi-engined aircraft, means for simulating the engine and propeller vibrations, means operable representative of the speed of each of two engines, said vibration simulating means being associable with either of said latter means whereby it is operable at a speed commensurate with the engine speed represented by the operated means at the time associated therewith, means for comparing the represented engine speeds, and means controlled by said comparing means for transferring said vibration simulating means from one to the other of said speed representing means when the engine speed represented by the means at the time in control of the vibration simulating means is less than the speed represented by the speed representing means not in control speed.

2. In a ground trainer for simulating a multi-engined aircraft, a motor, an eccentrically mounted weight driven thereby for simulating the engine and propeller vibrations, means operable representative of the speed of each of two engines, said motor being associable with either of said latter means whereby it is operable at a speed commensurate with the engine speed represented by the operated means at the time associated therewith, means for comparing the represented engine speeds, and means controlled by said comparing means for transferring said motor from one to the other of said speed representing means when the engine speed represented by the means at the time in control of the vibration simulating means is less than the speed represented by the speed representing means not in control.

3. In a ground trainer for simulating a multi-engined aircraft, a motor, an eccentrically mounted weight driven thereby for simulating the engine and propeller vibrations, means operable representative of the speed of each of two engines, said motor being associable with either of said latter means whereby it is operable at a speed commensurate with the engine speed represented by the operated means at the time associated therewith, means for comparing the simulated speeds of said simulated engines, and a switching relay controlled by said comparing means for transferring said motor from one to the other of said speed representing means when the engine speed represented by the means at the time in control of the vibration simulating means is less than the speed represented by the speed representing means not in control.

4. In a ground trainer for simulating a multi-engined aircraft, a motor, an eccentrically mounted weight driven thereby for simulating the engine and propeller vibrations, means operable representative of the speed of each of two engines, said motor being associable with either of said latter means whereby it is operable at a speed commensurate with the engine speed represented by the operated means at the time associated therewith, an electric power supply, means in said speed representing means for deriving potentials from said power supply which vary in accordance with the represented engine speeds, means for comparing said potentials, and means effective when potential derived in accordance with the engine speed representing means which at the time has control of said motor is less than the potential derived in accordance with the engine speed representing means which does not have control of said motor for transferring the control of said motor to said latter means.

5. In a ground trainer for simulating a multi-engined aircraft, a motor, an eccentrically mounted weight driven thereby for simulating the engine and propeller vibrations, means operable representative of the speed of each of two engines, an electric power supply, means in each of said latter means for deriving a potential from said power supply commensurate with the engine speed represented by the operated means at the time associated therewith, means for associating said motor with either of said latter means whereby it is operable at a speed commensurate with the represented engine speed, other means in each of said engine speed representing means for deriving a potential from said power supply commensurate with the engine speed, means for comparing said latter potentials, and means effective when potential derived in accordance with the engine speed representing means which at the time has control of said motor is less than the potential derived in accordance with the engine speed representing means which does not have control of said motor for transferring the control of said motor to said latter means.

6. In a ground trainer for simulating a multi-engined aircraft, a motor, an eccentrically mounted weight driven thereby for simulating the engine and propeller vibrations, means operable representative of the speed of each of two engines, said motor being associable with either of said latter means whereby it is operable at a speed commensurate with the engine speed represented by the operated means at the time associated therewith, an electric power supply, means in said latter means for deriving potentials from said power supply which vary in accordance with the represented engine speeds, an amplifier tube for amplifying the potential difference between said derived potentials, an electronic device responsive to the amplified difference potentials, and a switching relay controlled by said electronic device for transferring the control of said motor to the engine speed representing means which is at the time deriving a potential representative of a greater engine speed.

7. In a ground trainer for simulating a multi-engined aircraft, a motor, an eccentrically mounted weight driven thereby for simulating the engine and propeller vibrations, means operable representative of the speed of each of two engines, means for normally associating said motor with one of said latter means whereby it is operable at a speed commensurate with the engine speed represented by the associated operated means, an electric power supply, means in said latter means for deriving potentials from said power supply which vary in accordance with the represented engine speeds of rotation, an amplifier tube for amplifying the potential difference between said derived potentials, a gas-filled tube responsive to said amplified potential only when said amplified potential signifies that the engine speed of the engine speed representing means with which said motor is normally associated becomes less than the engine speed of the other engine speed representing means, and means responsive to the firing of said gas-filled tube to transfer said motor to the other engine speed representing means.

JOSEPH J. LUKACS.

No references cited.